(12) United States Patent
Ainslie et al.

(10) Patent No.: US 8,326,861 B1
(45) Date of Patent: Dec. 4, 2012

(54) PERSONALIZED TERM IMPORTANCE EVALUATION IN QUERIES

(75) Inventors: Alex Ainslie, Princeton, NJ (US); Nan Li, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 239 days.

(21) Appl. No.: 12/822,114

(22) Filed: Jun. 23, 2010

(51) Int. Cl.
*G06F 17/30* (2006.01)

(52) U.S. Cl. ......... 707/768; 707/766; 707/778; 707/784

(58) Field of Classification Search ................. None
See application file for complete search history.

(56) References Cited

U.S. PATENT DOCUMENTS

| | | | |
|---|---|---|---|
| 5,263,167 A | 11/1993 | Conner et al. | |
| 5,317,507 A * | 5/1994 | Gallant | 715/260 |
| 5,325,298 A * | 6/1994 | Gallant | 704/9 |
| 5,421,008 A | 5/1995 | Banning et al. | |
| 5,619,709 A * | 4/1997 | Caid et al. | 715/209 |
| 5,644,740 A * | 7/1997 | Kiuchi | 715/853 |
| 5,664,172 A | 9/1997 | Antoshenkov | |
| 5,671,416 A * | 9/1997 | Elson | 717/106 |
| 5,692,176 A * | 11/1997 | Holt et al. | 1/1 |
| 5,701,469 A * | 12/1997 | Brandli et al. | 1/1 |
| 5,721,900 A | 2/1998 | Banning et al. | |
| 5,721,901 A | 2/1998 | Banning et al. | |
| 5,761,497 A * | 6/1998 | Holt et al. | 1/1 |
| 5,771,378 A * | 6/1998 | Holt et al. | 1/1 |
| 5,778,361 A * | 7/1998 | Nanjo et al. | 1/1 |
| 5,778,363 A | 7/1998 | Light | |
| 5,794,178 A * | 8/1998 | Caid et al. | 704/9 |
| 5,870,737 A | 2/1999 | Dockter et al. | |
| 5,911,138 A | 6/1999 | Li et al. | |
| 6,012,055 A * | 1/2000 | Campbell et al. | 1/1 |
| 6,023,697 A | 2/2000 | Bates et al. | |
| 6,067,552 A * | 5/2000 | Yu | 715/234 |
| 6,081,814 A | 6/2000 | Mangat et al. | |
| 6,226,638 B1 * | 5/2001 | Okura et al. | 1/1 |
| 6,326,962 B1 * | 12/2001 | Szabo | 715/762 |
| 6,356,922 B1 | 3/2002 | Schilit et al. | |
| 6,411,950 B1 | 6/2002 | Moricz et al. | |
| 6,453,312 B1 | 9/2002 | Goiffon et al. | |
| 6,523,021 B1 | 2/2003 | Monberg et al. | |
| 6,658,623 B1 | 12/2003 | Schilit et al. | |

(Continued)

OTHER PUBLICATIONS

Chirita, Paul A. et al., "Personalized Query Expansion for the Web," Jul. 23-27, 2007, ACM SIGIR '07, pp. 7-14.

(Continued)

*Primary Examiner* — Farhan Syed
(74) *Attorney, Agent, or Firm* — Fish & Richardson P.C.

(57) ABSTRACT

Methods, systems, and apparatus, including computer program products, for personalized term importance evaluation in natural language queries are disclosed. The personalized term importance evaluation utilizes a personalized profile tree constructed using search history associated with a user. The personalized profile tree is a hierarchy of nodes representing categories of information that the user has previously searched or selected from search results. When a search query is received from the user, each term and phrase in the search query is compared against the nodes in the personalized profile tree, and an importance score is given to the search term or phrase based on the depth of a matching node in the tree, and a child count for the matching node. An alternative query can be generated from a subset of the search terms that have respective importance scores exceeding a predetermined threshold.

27 Claims, 5 Drawing Sheets

U.S. PATENT DOCUMENTS

| | | |
|---|---|---|
| 6,691,106 B1 | 2/2004 | Sathyanarayan |
| 6,741,983 B1 | 5/2004 | Birdwell et al. |
| 6,772,150 B1 | 8/2004 | Whitman et al. |
| 6,829,599 B2 | 12/2004 | Chidlovskii |
| 6,941,524 B2 | 9/2005 | Lee et al. |
| 6,947,930 B2 | 9/2005 | Anick et al. |
| 7,062,483 B2* | 6/2006 | Ferrari et al. ............... 1/1 |
| 7,113,944 B2 | 9/2006 | Zhang et al. |
| 7,266,545 B2 | 9/2007 | Bergman et al. |
| 7,272,612 B2 | 9/2007 | Birdwell et al. |
| 7,325,201 B2* | 1/2008 | Ferrari et al. ............ 715/737 |
| 7,565,627 B2 | 7/2009 | Brill et al. |
| 7,567,957 B2* | 7/2009 | Ferrari et al. ............... 1/1 |
| 7,617,184 B2* | 11/2009 | Ferrari et al. ............... 1/1 |
| 7,716,229 B1 | 5/2010 | Srivastava et al. |
| 7,743,044 B1 | 6/2010 | Kalogeraki et al. |
| 7,756,864 B2 | 7/2010 | Chandrasekar et al. |
| 7,765,178 B1 | 7/2010 | Roizen et al. |
| 7,822,774 B2 | 10/2010 | Craswell et al. |
| 7,890,526 B1 | 2/2011 | Brewer et al. |
| 7,991,769 B2 | 8/2011 | Fontoura et al. |
| 2002/0051020 A1* | 5/2002 | Ferrari et al. ............. 345/854 |
| 2002/0083039 A1* | 6/2002 | Ferrari et al. ............. 707/1 |
| 2003/0126235 A1 | 7/2003 | Chandrasekar et al. |
| 2003/0218639 A1 | 11/2003 | Lee et al. |
| 2004/0186846 A1 | 9/2004 | Birdwell et al. |
| 2004/0186920 A1 | 9/2004 | Birdwell et al. |
| 2005/0071328 A1* | 3/2005 | Lawrence ................. 707/3 |
| 2005/0187931 A1* | 8/2005 | Cofino et al. ............. 707/5 |
| 2005/0222989 A1* | 10/2005 | Haveliwala et al. ...... 707/3 |
| 2006/0064432 A1 | 3/2006 | Pettovello |
| 2006/0074891 A1 | 4/2006 | Chandrasekar et al. |
| 2006/0277309 A1 | 12/2006 | Eaton |
| 2007/0027914 A1* | 2/2007 | Agiwal .................. 707/104.1 |
| 2007/0083505 A1* | 4/2007 | Ferrari et al. ............. 707/5 |
| 2007/0094245 A1 | 4/2007 | Vigil |
| 2007/0136247 A1 | 6/2007 | Vigil |
| 2007/0156677 A1* | 7/2007 | Szabo ...................... 707/5 |
| 2007/0174309 A1 | 7/2007 | Pettovello |
| 2007/0185831 A1 | 8/2007 | Churcher |
| 2007/0255748 A1 | 11/2007 | Ferragina et al. |
| 2007/0260671 A1* | 11/2007 | Harinstein et al. ......... 709/203 |
| 2008/0010253 A1 | 1/2008 | Sidhu et al. |
| 2008/0109461 A1 | 5/2008 | Birdwell et al. |
| 2008/0306934 A1 | 12/2008 | Craswell et al. |
| 2009/0019002 A1 | 1/2009 | Boulis |
| 2009/0055361 A1 | 2/2009 | Birdwell et al. |
| 2009/0198644 A1 | 8/2009 | Buchner et al. |
| 2009/0254543 A1* | 10/2009 | Ber et al. ................ 707/5 |
| 2010/0085893 A1 | 4/2010 | Kim et al. |
| 2011/0016115 A1 | 1/2011 | Craswell et al. |
| 2011/0179084 A1* | 7/2011 | Waddington et al. ......... 707/794 |
| 2011/0225155 A1 | 9/2011 | Roulland et al. |
| 2011/0289460 A1 | 11/2011 | Dow et al. |
| 2011/0320498 A1 | 12/2011 | Flor |
| 2012/0023055 A1 | 1/2012 | Dagaeff |

OTHER PUBLICATIONS

R. Baeza-Yates, C. Hurtado, and M. Mendoza, "Query Recommendation Using Query logs in Search Engines," Nov. 2004, Lecture Notes in Computer Science, Springer Berlin/Heidelberg, pp. 588-596.

M. Barouni-Ebrahimi and A.A. Ghorbani, "A Novel Approach for Frequent Phrase Mining in Web Search Engine Query Streams," CNSR '07: Proceedings of the 5th Annual Conference on Communication Network and Services Research, pp. 125-132, 2007.

P. Boldi, F. Bonchi, C. Castillo, et al., "Query Suggestions using Query-Flow Graphs," WSCD '09: Proceedings of the 2009 Workshop on Web Search Click Data, pp. 56-63, 2009.

H. Cao, D. Jiang, et al., "Context-aware query suggestion by mining click-through and session data," KDD '08, pp. 875-883. 2008.

S. Cucerzan and R.W. White, "Query Suggestion Based on User Landing Pages," SIGIR '07: Proceedings of the 30th Annual International ACM SIGIR Conference on Research and Development in Information Retrieval, pp. 875-876, 2007.

Q. Mei, d. Zhou, and K. Church, "Query Suggestion Using Hitting Time," CIKM '08: Proceedings of the 17th ACM Conference on Information and Knowledge Management, pp. 469-478, 2008.

Bhatia, Sumit, et al., "Query Suggestions in the Absence of Query Logs," Jul. 24-28, 2011, Beijing, China, SIGIR '11, pp. 1-10.

Rocha, Marcelo Gabriel Mendoza, "Query Log Mining in Search Engines," 2007, University of Chile, Computer Science, Ph.D. Thesis, pp. 1-138.

Bar-Youssef, Ziv and Gurevich, Maxim, "Mining Search Engine Query Logs via Suggestion Sampling," Aug. 23-28, 2008, PVLDB '08, pp. 54-65.

Zhang, Zhiyong, et al., "Mining Search Engine Query Logs for Query Recommendation," May 22-26, 2006, WWW '06, pp. 1039-1040.

S. Lin, C. Huang, "Personalized Optimal Search in Local query Expansion," [online] Retrieved on Jun. 7, 2012 [Retrieved from Internet electronic mail: http://aclweb.org/anthology-new/O/O06/O06-1015.pdf], Dept. of Information Management, National Yunlin University of Technology and Science, Douliou, Taiwan, Publication Date Unknown.

* cited by examiner

PERSONALIZED TERM IMPORTANCE EVALUATION IN QUERIES

BACKGROUND

This specification relates generally to information retrieval based on search queries. The Internet provides access to a wide variety of resources, for example, video files, image files, audio files, or Web pages including content for particular subjects, book articles, or news articles. A search system can select one or more resources in response to receiving a search query. A search query is data that a user submits to a search engine to satisfy the user's informational needs. The search queries are usually in the form of text, e.g., one or more query terms. The search system selects and scores resources based on their relevance to the search query and on their importance relative to other resources to provide search results that link to the selected resources. The search results are typically ordered according to the scores and presented according to this order.

Many search engines allow a user to perform searches using natural language queries. Natural language queries often include terms that are commonly used in full sentences but are not essential to the concepts for which the user wishes to obtain more information. These common terms can sometimes be identified based on their high frequencies of occurrence in a document corpus, and given less weight during a search when presented with other, less frequent search terms.

Even with the generalized term importance evaluation describe above, however, a search engine may return results that are not of interest to the user, or do not fully satisfy the user's need for information. There can be a number of reasons that the search engine may provide such results. For example, the weights given to the terms in the query may not have reflected the user's specific interests (e.g., when a word in a query that is deemed more important by the user is attributed less weight by the search engine than other words in the query, or vice versa). Sometimes, the query itself may be a poor expression of the information needed, or the query may have included terms that are extraneous, misspelled, or used in an unconventional way.

SUMMARY

This specification describes technologies relating to query refinement, through personalized term importance evaluation.

In one aspect, a method includes the actions of: receiving a search query, the search query comprising a sequence of search terms and associated with a user identifier; and accessing a profile tree associated with the user identifier and including a hierarchy of nodes, the hierarchy of nodes including a root node and a plurality of child nodes, each child node descending from the root node or another child node, the profile tree defining a plurality of levels, each level including child nodes that descend from the root node at a same depth, and each node of the profile tree representing a respective topic that is derived from search history data associated with the user identifier. The method further includes, for each of the search terms, the actions of: identifying in the profile tree one or more nodes that match the search term; determining the respective levels of the one or more nodes that match the search term; and deriving a respective importance score for the search term based on the respective levels of the one or more nodes that match the search term. The method further includes the actions of: identifying search terms in the search query that have respective importance scores exceeding a threshold; and generating an alternative query from the identified search terms that have respective importance scores that exceed the threshold.

Other embodiments of this aspect include corresponding systems, apparatus, and computer programs, configured to perform the actions of the methods, encoded on computer storage devices.

These and other embodiments can each optionally include one or more of the following features.

In some implementations, importance associated with a node increases with increasing depth of a respective level associated with the node in the profile tree.

In some implementations, the method further includes the actions of: for each of the search terms, determining a respective child count for each of the one or more nodes that match the search term; and the importance score for the search term is derived based on both the respective counts of child nodes and the respective levels of the one or more nodes that match the search term.

In some implementations, importance associated with a node decreases with an increasing child count for the node in the profile tree.

In some implementations, the method further includes the actions of: removing one or more stop words from the search query to produce the sequence of search terms.

In some implementations, each node of the profile tree includes search terms and phrases previously entered by a user in association with the user identifier, and the search terms and phrases included in the profile tree are distributed among the nodes of the profile tree according to the respective topics to which the search terms and phrases belong.

In some implementations, for each of the sequence of search terms in the search query, the one or more nodes that match the search term explicitly include the search term.

In some implementations, each node of the profile tree includes terms and phrases extracted from result documents that have been previously selected by a user in association with the user identifier, and the terms and phrases included in the profile tree are distributed among the nodes in the profile tree according to the respective topics to which the terms and phrases belong.

In some implementations, for each of the sequence of search terms in the search query, the one or more nodes that match the search term each represents a respective topical category that includes a concept represented by the search term.

In some implementations, the method further includes the actions of: generating a plurality of search phrases from the sequence of search terms, each search phrase including two or more consecutive search terms. The method further includes, for each of the search phrases, identifying in the profile tree one or more nodes that match the search phrase; determining the respective levels of the one or more nodes that match the search phrase; determining respective counts of child nodes for the one or more nodes that match the search phrase; and deriving a respective importance score for the search phrase based on the respective levels and the respective counts of child nodes for the one or more nodes that match the search phrase. The method further includes the actions of: identifying search phrases in the search query that have respective importance scores exceeding the threshold; and generating the alternative query from both the identified search terms and the identified search phrases that have respective importance scores exceeding the threshold.

In some implementations, the method further includes the actions of: prior to accessing the profile tree and generating the alternative query, performing a first search using the search query to identify a first plurality of result documents responsive to the search query; determining quality of the first plurality of result documents; proceeding to accessing the profile tree and generating the alternative query if the quality of the first plurality of result documents does not satisfy a pre-determined quality criterion; and providing first search result data to a client device associated with the user identifier if the quality of the first plurality of result document satisfy the pre-determined quality criterion, the first search result data operable for causing the client device to present a first result listing comprising the first plurality of result documents.

In some implementations, the method further includes: performing a second search using the alternative query to identify a second plurality of result documents responsive to the alternative query; and providing second search result data to the client device associated with the user identifier, the second search result data operable for causing the client device to present a second result listing comprising the second plurality of result documents.

Particular embodiments of the subject matter described in this specification can be implemented to realize one or more of the following advantages.

A search engine utilizes a tree-structured personal profile associated with the user to identify a subset of the search terms that are more likely to reflect the user's interests and then performs a search using only the subset of search terms. By performing the search using only the subset of search terms, higher quality search results that are relevant to the user's specific interests may be obtained.

The tree-structured personal profile is a hierarchy of nodes representing topics and categories of information that may be of interest to the user. The tree-structured personal profile can be built based on the user's prior search history and/or web browsing history. Each search term in a user-submitted query can be compared against nodes in the personal profile tree, and the specificity and importance of the search term (e.g., as relative to other search terms in the query) can be evaluated based on the depths and child counts of certain nodes in the profile tree that match the search term. The specific structure and comprehensiveness of the profile tree associated with the user can be varied and improved over time without affecting the process for term importance evaluation. Therefore, the system and method for personalized term importance evaluation disclosed in herein are modular and scalable.

The details of one or more embodiments of the subject matter described in this specification are set forth in the accompanying drawings and the description below. Other features and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes evaluating term importance in a search query based on a personal profile tree.

Example Information Retrieval System

Figure 1:
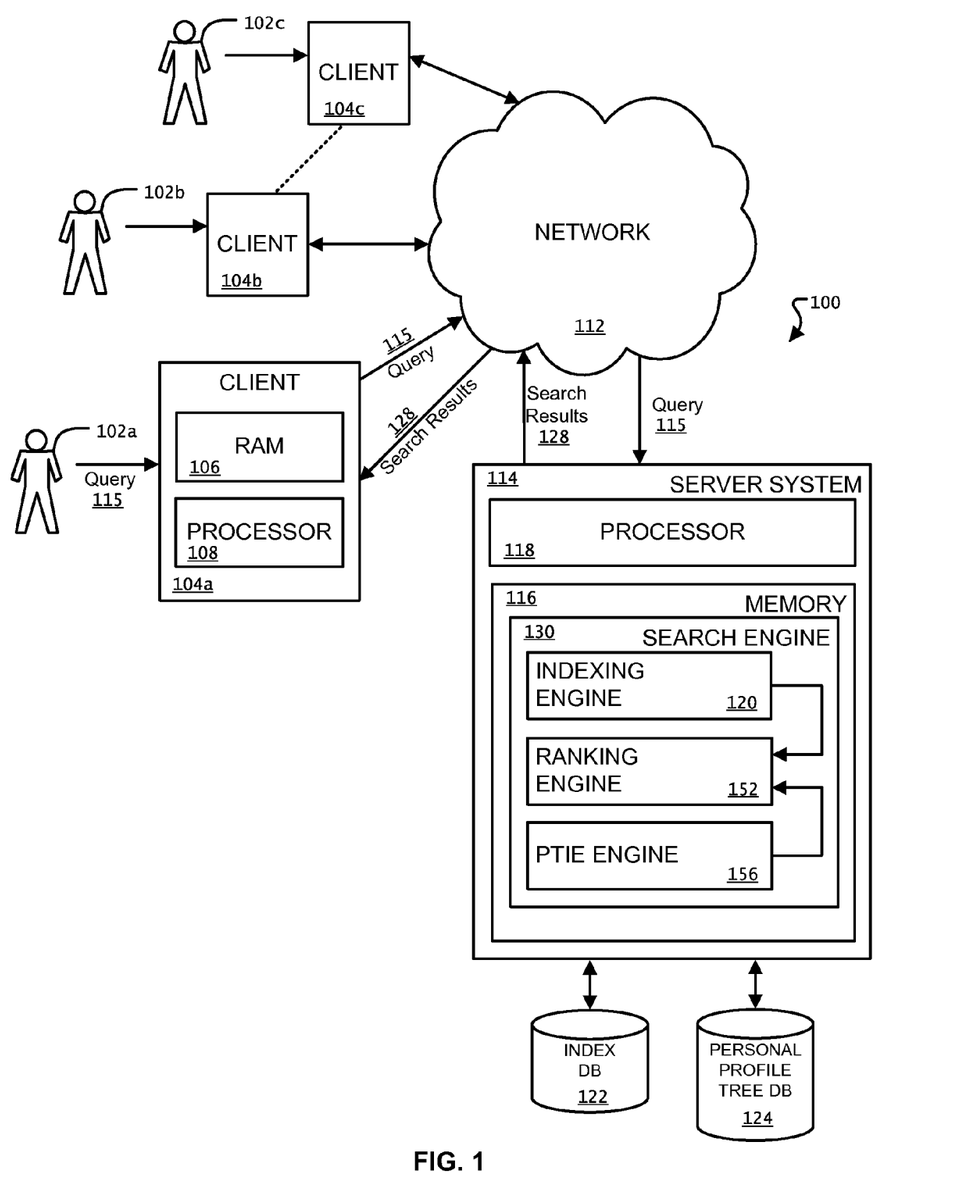
FIG. 1 is a block diagram of an example environment 100 in which an information retrieval system is implemented.

FIG. 1 is a block diagram of an example environment 100 in which an information retrieval system is implemented. The environment 100 can be implemented in an Internet, intranet, or other client/server environment. A server system 114 generates search results in response to search queries submitted by users (e.g., 102*a-c* using client devices 104*a-c*). Although several components are illustrated, there may be fewer or more components in the environment 100. Moreover, the components can be distributed on one or more computing devices connected by one or more networks or other suitable communication mediums.

In the example environment 100, a user (e.g., 102*a*) can interact with the server system 114 through a client device (e.g., 104*a*) or other device. The client device 104*a* can be a computer terminal within a local area network (LAN) or wide area network (WAN). The client device 104*a* includes a random access memory (RAM) 106 (or other memory and/or storage device) and a processor 108. The processor 108 is structured to process instructions within the client device 104*a*. In some implementations, the processor 108 is structured to process instructions stored in the RAM 106 (or other memory and/or storage device included with the client device 104*a*) to display graphical information for a user interface.

The user 102*a* can connect to a search engine 130 within the server system 114 to submit a search query 115. The user 102*a* submits the search query 115 through an input device attached to the client device 104*a*. The query 115 is sent into a network 112 and is forwarded to the server system 114. The server system 114 can be one or more server devices in one or more locations. A server device of the server system 114 can include a memory device 116 having the search engine 130 loaded therein. The server device can also include one or more processors 118. The processor 118 processes instructions stored in the memory device 116 that are related to the search engine 130 and sends information to the client device 104*a*, through the network 112, to create a graphical representation of search results in a user interface of the client device 104*a* (e.g., a search results webpage displayed in a web browser).

After the query 115 is received by the search engine 130, the search engine 130 uses the information within the query 115 (e.g., search terms) to find relevant documents. The search engine 130 includes an indexing engine 120 that actively searches a corpus (e.g., webpages on the Internet) to index the documents found in that corpus. The index information for the documents in the corpus is stored in an index database 122. This index database 122 is accessed to identify documents related to the user query 115. Note that, an electronic document (which for brevity will simply be referred to as a document) does not necessarily corresponds to a file. A document can be stored in a portion of a file that holds other documents, in a single file dedicated to the document in question, or in multiple coordinated files. Moreover, a document can be stored in a memory without having first been stored in a file.

The search engine 130 also includes a ranking engine 152 to rank the documents responsive to the user query 115. The ranking of the documents is performed using techniques for determining an information retrieval score for indexed documents in view of a given query. Factors that influence the information retrieval score of the document include, for example, the quality of the document, the authority (e.g., as reflected by general level of back-links to the document), general user-feedback related to the document (e.g., as reflected by the click-through rate of the document when it was presented as a search result), and so on.

The information retrieval score of a document is based, in part, on the relevance of the document in light of the search terms included in the search query. The relevance of a particular document with respect to a particular search term or to other provided information can be determined by various techniques. For example, the number of occurrences and locations of the search term in a document may be used to infer the document's relevance score with respect to the search term. When multiple search terms are present in the search query, the relevance of the document with respect to the entire query can be based on a combination of the document's relevance scores with respect to all search terms in the query, with the exception of certain stop words (e.g., "a," "the," "is," "to," etc.) included in the query.

In some implementations, the document's relevance scores with respect to each search term in the query can be given different weights in the combined relevance score of the document depending on the search terms' relative importance in the search query. In some implementations, the relative importance of the search terms can be based on a generalized assessment of the terms' specificity and frequency of occurrence, for example, by statistical analysis of the document corpus or common usage of the terms. Frequently, terms that are more specific and/or less frequent are given more weight than terms that are more general and/or more frequent.

In addition, the relative importance of the search terms are personalized by taking into consideration the search and web browsing history of individual users, such that relative weights given to the search terms reflect not only the generalized assessment of relative term importance, but also the individualized interests of the particular user submitting the search query.

In some implementations, the search engine 130 includes a personalized term importance evaluation (PTIE) engine 156. The PTIE engine 156 can utilize the information stored in the personal profile tree database 124 to boost and/or demote the importance (as represented by the weight) of a search term or phrase relative to other terms and/or phrases in a search query. The personal profile tree database includes the personal profile trees of multiple users, where each personal profile tree is associated with a particular user identifier and built according to the search history and/or web browsing history associated with the particular user identifier.

When the client device 104a transmits the query 115 to the server system 114, the query signal 110a can be accompanied by, or paired to, a user identifier associated with the client device 104a. The user identifier can be a username associated a user account registered at the server system 114, a network address of the client device 104a, a device identifier for the client device 104a, a digital signature of the user 102a, and so on. In some implementations, the server system 114 can gather information from multiple sources to correlate different types of identifying information associated with the user 102a and/or the client device 104a, such that any of the identifying information can be used as the user identifier for the user 102a and/or the client device 104a.

In some implementations, to protect the privacy of users, the server system 114 anonymizes the historical data for the user so that the user's search history data cannot be associated with the user. However, if the user opts-in for tracking of the user history data, the sever system 114 can associate search queries and clicks with the user identifier that is uniquely associated with the user. The server system 114 can optionally associate other data with the user identifier, such as a navigational history of user sessions associated with the user identifier, bookmarks associated with the user identifier, and subscribed feeds associated with the user identifier. At the user's option, the server system 114 can be configured to track only data approved by the user, such as only search queries and search result selections. The user can clear all history data associated with the user's identifier account at any time, and can opt-out of such tracking at any time.

When the search engine 130 receives a search query and its associated user identifier, the PTIE engine 156 can derive personalized term importance scores for each term and phrase in the search query based on the personal profile tree associated with the same user identifier. In some implementations, the PTIE engine 156 provides the personalized term importance scores to the ranking engine 152 as additional input for selecting and ranking result documents for the user-submitted query.

In some implementations, the PTIE engine 156 generates a shortened alternative query using a subset of query terms that have importance scores exceeding a predetermined threshold. The search engine 130 then performs the search for result documents based on the shortened alternative query. In some implementations, the shortened alternative query is only used if the quality of result documents found based on the original search query does not meet certain quality requirements (e.g., the IR scores of the retrieved result documents do not meet a certain threshold value).

Once the result documents are identified and scored, the search engine 130 forwards the final, ranked result list within a search result list 128 through the network 112. Exiting the network 112, the search result list 128 is received by the client device 104a where the results are stored in the RAM 106 and/or used by the processor 108 to display the results on an output device for the user 102a.

In some implementations, the server system 114 stores the queries received from client devices in a search history database. Information, such as the user identifiers associated with the client devices from which the queries were submitted, the time of the query submission, the geographical areas from which the queries were submitted, the search results retrieved and displayed in response to the search queries, and the respective user responses to the search results presented, can be stored in association with each query and used as indices for retrieving the query. In addition, server system 114 can utilize various monitoring tools (e.g., a tool bar plug-in) to track an individual user's web browsing activities, and stores the web browsing history in association with the user's user identifier. The search history and/or web browsing history associated with each user identifier can then be used to build and update the personal profile tree associated with the user identifier in the personal profile tree database 124.

In some implementations, to protect the privacy of users, the user must opt-in for tracking of the user history data. At the user's option, the server system 114 can be configured to track only data approved by the user, such as only search queries and search result selections. The user can clear all history data associated with the user's identifier account at any time, and can opt-out of such tracking at any time.

Personal Profile Tree

Figure 2:
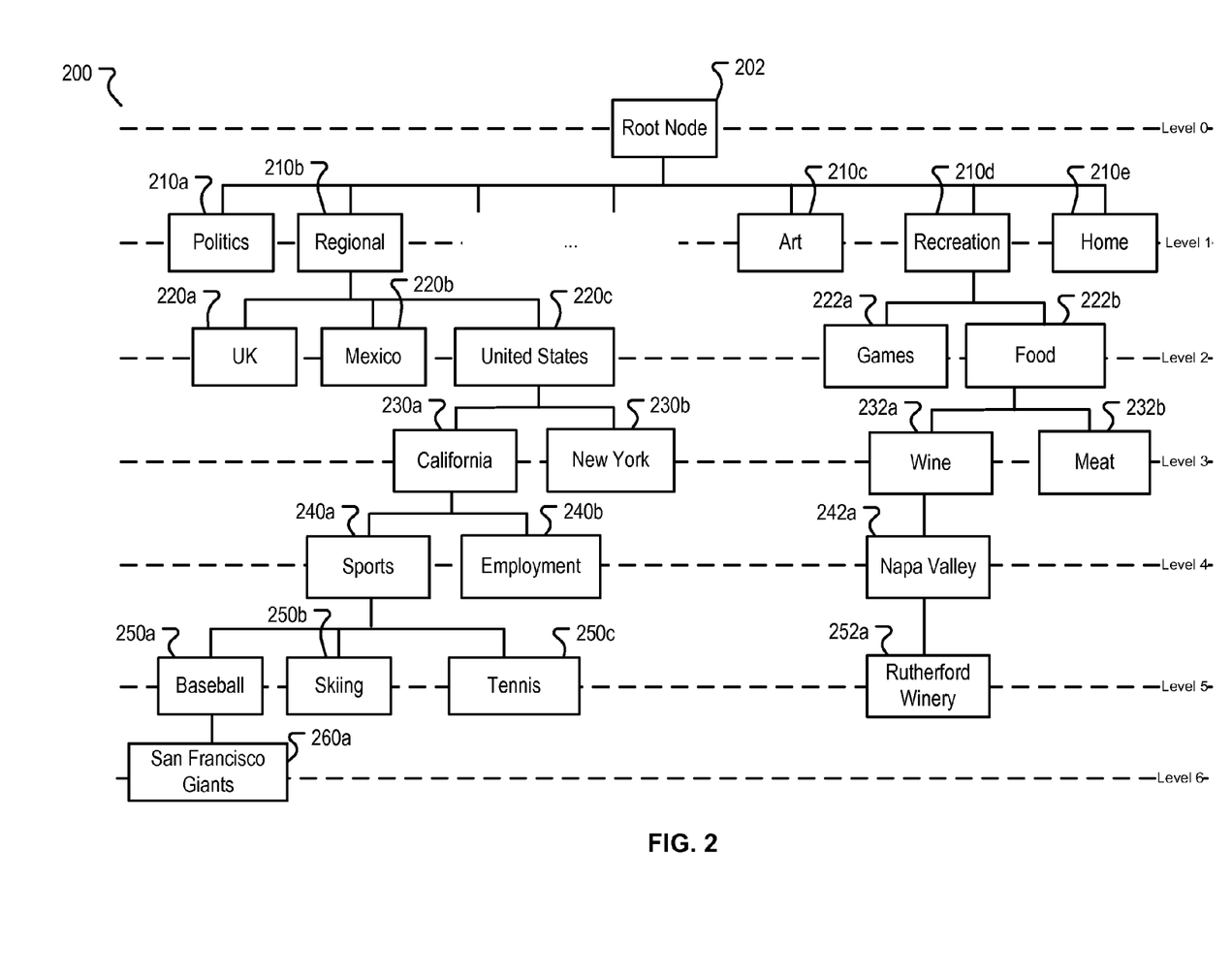
FIG. 2 is a block diagram of an example personal profile tree.

FIG. 2 illustrates an example personal profile tree 200 associated with a user identifier. The example personal profile tree 200 is a hierarchy of nodes representing various topics and categories of information that may be of interest to the user associated with the user identifier. The hierarchy of nodes includes a root node 202 and a number of child nodes (e.g., nodes 210a-e, 220a-c, 222a-b, 230a-b, 232a-b, 240a-b, 242a, a50a-c 252a, and 260a). Each child node descends from either the root node 202 or another child node. For example, child nodes 210a-e descends directly from root node 202; and child nodes 220a-c descends directly from child node 210b.

The profile tree 200 defines a number of levels (e.g., levels 0 through 6 shown in FIG. 2), where each level includes child nodes that descend from the root node 202 at the same depth. For example, child nodes 210a-c are located on level 1 of the profile tree 200, child nodes 220a-c and 222a-b are located on level 2 of the profile tree 200, child nodes 230a-b and 232a-b are located on level 3 of the profile tree 200, and so on. In some implementations, the depth of a child node in the profile tree can be equal to the number of ancestor nodes from which the child node descends. For example, the child node 260a is located on level 6 of the profile tree 200, and child node 260a has six ancestor nodes (e.g., the child nodes 250a, 240a, 230a, 220c, 210b, and the root node 202) from which the child node 260a descend.

Each node in the profile tree 200 may have no child node, one child node, or multiple children nodes directly descending from it. If a child node has no descendents, then it is called a leaf node. For each node in the profile tree, a child count for the node is equal to the number of child nodes descending directly from the node. For example, the child node 210b has three child nodes (e.g., child nodes 220a-c) descending directly from it, and therefore a child count of three, while the child node 260a has no child node descending directly from it, and therefore a child count of zero.

In some implementations, instead of defining the child count to equal to only the number of child nodes descending directly from a node, the child count of a node can be defined as a count of all child nodes descending the node, regardless of whether they do so directly or indirectly. For example, in these implementations, the child node 210d has a child count of 6.

Each node in the profile tree 200 associated with a user identifier represents a topic or information category that may be of interest to a user associated with the user identifier. The hierarchy of nodes in the profile tree 200 represents increasingly specific topics and information categories as the tree is descended. In general, the specificity of the topic or information category represented by a node increases with an increasing depth of the node in the profile tree 200. Similarly, the specificity of the topic or information category represented by a node decreases with an increasing child count for the node in the profile tree 200.

The profile tree 200 associated with a user identifier can be constructed according to various information known to be of interest to the user associated with the user identifier. In some implementations, the personal profile tree 200 can be constructed using the search history that is associated with the user identifier.

For example, each node in the profile tree can represent a topic or information category in which the user has searched before. In some cases, a node in the profile tree 200 can include a single search term that the user has previously submitted in a search query. In a simplified example, suppose the user has previously submitted a query "San Francisco Giants," which is the name of a major league baseball team in San Francisco, a child node (e.g., child node 260a) including this very specific search phrase can be inserted in the personal profile tree 200 of the user as a leaf node.

In addition, a number of more general topics can be derived from this very specific search query (e.g., "San Francisco Giants"), and each of these topics can form the ancestor nodes (e.g., child nodes 210b, 220c, 230a, 240a, and 250a) above the child node (e.g., 260a) corresponding to this very specific search query. In this simplified example, the ancestor nodes correspond to a hierarchy of topics with increasing specificity, including "Regional," "United States," "California," "Sports," and "Baseball." Sometimes, if one or more ancestor nodes already exist in the profile tree 200, only the new child nodes are added to the profile tree, and under their appropriate ancestor nodes. Otherwise, if the query "San Francisco Giants" is the first query that is used to build the profile tree for the user, then the tree is instantiated with the ancestor nodes 202, 210b, 220c, 230a, 240a, 250a, and 260a.

In some implementations, once a node is added to the personal profile tree 200, a collection of terms and phrases that describe the particular topic or category of information represented by the node can be included in the node. In some cases, the collection of terms and phrases include previously entered search terms that belong to the broad topic or information category represented by the node. For example, if the user has previously entered a search query "ski resorts in California," the search term such as "ski," can be included in the nodes representing "skiing," "sports," "California," "United States," and "Regional" as well. In some cases, terms and phrases not having been searched by the user but nonetheless belong to the broad category represented by the node can also be added to the node.

In some implementations, terms and phrases extracted from result documents that have been previously selected by the user can be also used to construct the personal profile tree 200. The extracted terms and phrases tree can be used to generate new nodes in the profile tree and/or distributed among the new and existing nodes in the profile tree according to the respective topics to which the terms and phrases belong.

In some implementations, the web browsing history associated with the user identifier of the user can also be used to construct the personal profile tree associated with the user identifier. Terms and phrases extracted from documents viewed by the user in association with the user identifier can be used to generate new nodes in the profile tree and/or distributed among the new and existing nodes in the profile tree according to the respective topics to which the terms and phrases belong.

In some implementations, other information reflecting the user's interests can be used to construct or to supplement the construction of the personal profile tree associated with the user's user identifier. As additional information (e.g., search history and web browsing history) accumulates over time, the profile tree can be updated with the additional information.

Personalized Term Importance Evaluation

Figure 3:
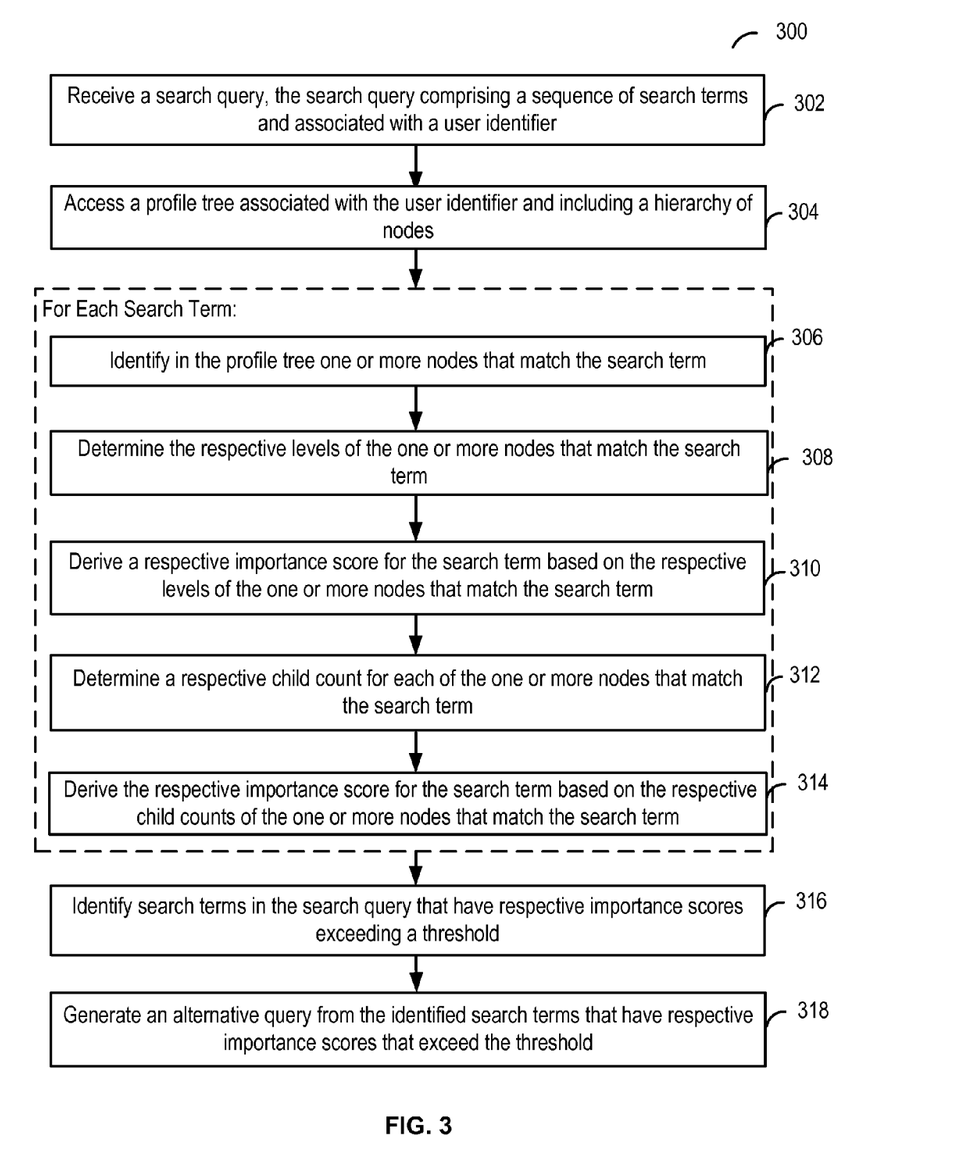
FIG. 3 is a flow diagram of an example process for generating an alternative query based on term importance evaluation using the personal profile tree.

FIG. 3 is a flow diagram of an example process 300 for generating an alternative query based on term importance evaluation using a personal profile tree. The example process 300 can be implemented by one or more components of the search engine 130 shown in FIG. 1.

The example process 300 starts when a search query is received (302), where the search query includes a sequence of search terms and is associated with a user identifier. In some implementations, one or more stop words can be removed first from the search query to produce the sequence of search terms. In a particular example, a search query "San Francisco Giants" includes three terms "San," "Francisco," and "Giants." In some implementations, "San Francisco" may be deemed as a single search term because it represents a single indivisible concept (a proper name for a city in this case). In another example, a long natural language search query "where can I find the tools for making metal sculptures" includes the sequence of search terms "where," "can," "I," "find," "the," "tools," "for," "making," "metal," "sculptures." If one or more stop words are removed first, the sequence of search terms can include "find," "tools," "making" "metal" and "sculptures," but not the stop words "where," "can," "I," "the," and "for."

After the search query is received and the sequence of search terms are identified, a profile tree associated with the user identifier is accessed (304). In various implementations, the profile tree includes a hierarchy of nodes, and the hierarchy of nodes includes a root node and a plurality of child nodes. Each child node descends from the root node or another child node. In addition, the profile tree defines a plurality of levels, each level including child nodes that descend from the root node at a same depth. Each node of the profile tree represents a respective topic that is derived from search history data associated with the user identifier.

In some implementations, each node of the profile tree includes search terms and phrases previously entered by a user in association with the user identifier, and the search terms and phrases included in the profile tree are distributed among the nodes of the profile tree according to the respective topics to which the search terms and phrases belong. In some implementations, each node of the profile tree includes terms and phrases extracted from result documents that have been previously selected by a user in association with the user identifier, and the terms and phrases included in the profile tree are distributed among the nodes in the profile tree according to the respective topics to which the terms and phrases belong.

An example of the profile tree is illustrated and described with respect to FIG. 2.

In some implementations, the profile tree associated with the user identifier is stored in a database, and the search engine 130 queries the database to retrieve the profile tree based on the user identifier.

For each of the sequence of search terms identified in the received search query, a respective importance score can be derived based on the information stored in the profile tree. To derive the importance score, one or more nodes that match the search term are first identified (306). In some implementations, the one or more nodes that match the search term explicitly include the search term. For example, the node "San Francisco Giants" explicitly includes the search term "San Francisco" and the search term "Giants." In some implementations, the one or more nodes that match the search term each represent a respective topical category that includes a concept represented by the search term. For example, the node "sports" would match the search term "Giants" because the "sports" category includes major league baseball teams such as the "Giants." Other methods of matching search query against nodes in the profile tree are possible. In some implementations, a match between a search query and a node can be declared if the search term represents a concept that belongs to the topical category represented by the node, regardless of whether the user has previously entered the search term or whether the node explicitly includes the search term.

In some implementations, a search term may find multiple matching nodes in the profile tree. These matching nodes can belong to a single branch of the profile tree or several different branches of the profile tree. For example, the search term "Giants" may find matching nodes in both the "Regional" branch and the "Recreation" branch because both can include child nodes corresponding to sports and sports teams.

After the matching nodes of a search term have been identified, the respective levels of the one or more nodes that match the search term can be determined (308). In some implementations, the levels are determined by querying an independent module with the search term as input, where the independent module searches the tree-structured profile and returns the matching nodes for the search term and their respective levels in the profile tree. In some implementations, the determination is done by searching the tree-structured profile directly to locate the matching nodes and find out their respective levels in the profile tree.

Then, for each search term, a respective importance score can be derived for the search term based on the respective levels of the one or more nodes that match the search term (310). Various scoring functions can be used to relate the importance score and the respective levels of the matching nodes in the profile tree. For example, the importance score can be directly proportional to the level of the lowest matching node (e.g., the matching node having the largest depth) in the profile tree, and asymptotically approaches a maximum value as the number of matching nodes increases. For another example, only the levels of the lowest matching nodes on different branches of the profile tree are taken into consideration in the importance score. Other ways of combining the levels of the matching nodes are possible. In general, the importance of a search term associated with a matching node increases with increasing depth of the level associated with the node in the profile tree. And in general, the importance of a search term increase as the number of matching nodes for the search term increases.

In some implementations, for each of the sequence of search terms, a respective child count is determined for each of the one or more nodes that match the search term (312), and the importance score for the search term can be derived based on the respective counts of child nodes of the one or more nodes that match the search term, in addition to the respective levels of the nodes (314). Various scoring functions can be used to relate the importance score and the respective child counts of the matching nodes in the profile tree. For example, the importance score can be inversely proportional to the child counts the lowest matching node (e.g., the matching node having the largest depth) found in different branches of the profile tree. In general, the importance of a search term associated with a matching node decreases with increasing child counts associated with the node in the profile tree.

In some implementations, the importance score can be derived based on a number of different factors in addition to the respective levels of the matching nodes in the profile tree and/or the count counts of the matching nodes in the profile tree. For example, the general assessment of term specificity and rarity can be a factor in determining the importance score as well. In some implementations, the information derived from the personal profile (e.g., the respective levels and child counts of the matching nodes in the personal profile tree) can be used to modify (e.g., boost or diminish) the importance score derived based on other relevant factors (e.g., generalized term importance evaluation). In some implementations, the importance scores for each term can be derived by parallel processing.

In some implementations, in addition to the individual terms in the search query, one or more search phrases including two or more consecutive search terms can be generated from the search query and have their respective importance evaluated. As with individual search terms, for each of the search phrases generated from the search query, one or more nodes that match the search phrase can be identified in the profile tree. The respective levels and respective child counts of the one or more nodes that match the search phrase can be determined, and a respective importance score for the search phrase can be derived based on the respective levels and/or the respective counts of child nodes for the one or more nodes that match the search phrase.

In some implementations, after the importance scores of the search query's constituent search terms and/or search phrases have been identified, a subset of search terms and/or search phrases that have respective importance scores exceeding a threshold are identified (316). An alternative query can be generated from the identified subset of search terms and/or phrases that have respective importance scores that exceed the threshold (318).

In some implementations, the search engine uses the search terms and phrases in the alternative search query to perform the search and presents the result documents of the alternative query to the user in response to the original search query submitted in association with the user identifier. In some implementations, the importance scores of the search query's constituent search terms and/or search phrases are used to derive relative weights for the respective IR scores of a particular result document with respect to the search terms and/or phases in deriving the combined IR score for the particular result document. Other uses of the importance scores are possible.

Figure 4:
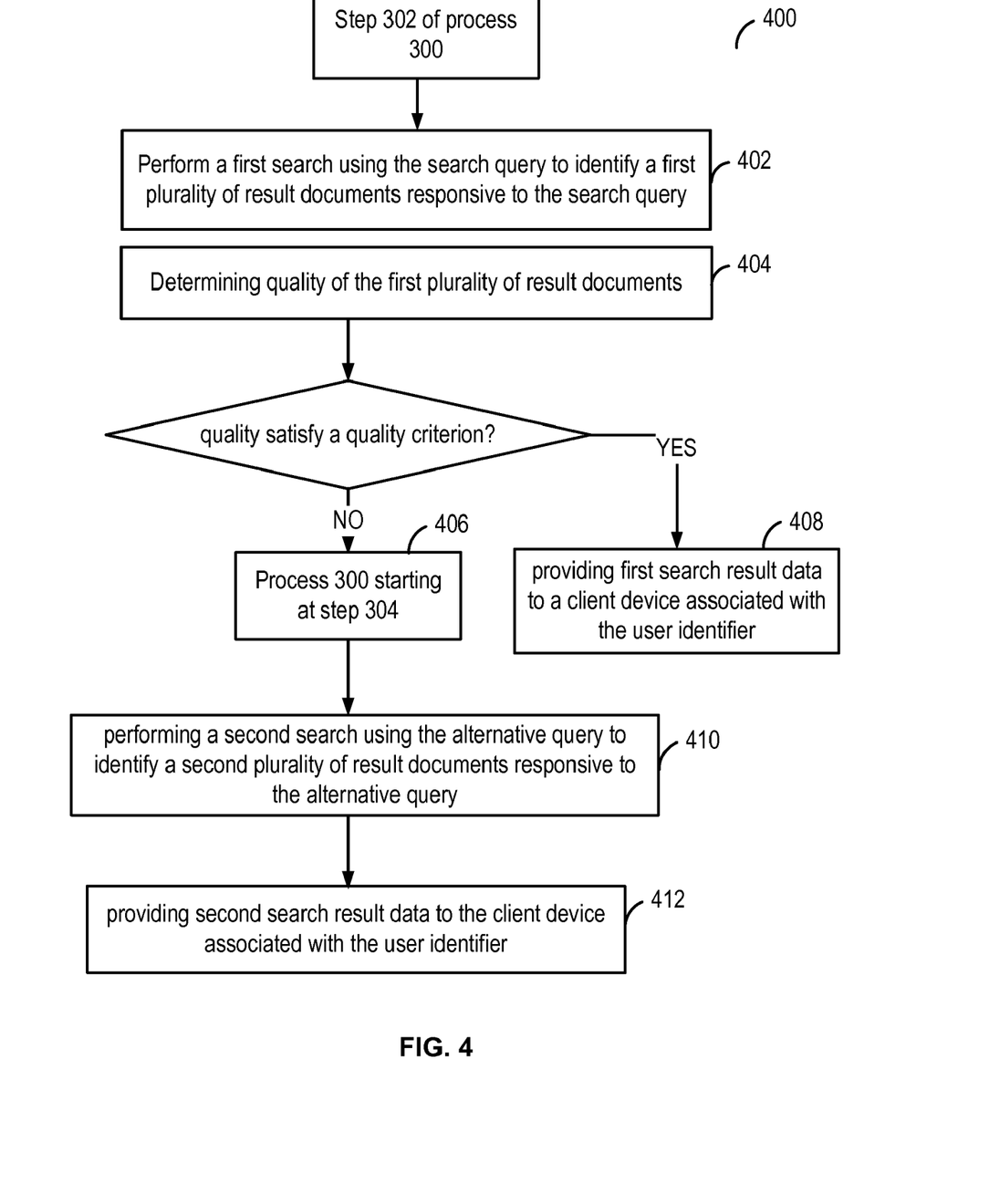
FIG. 4 is a flow diagram of an example process for invoking the alternative query when providing search results in response to a search query.

FIG. 4 is a flow diagram of an example process 400 for invoking the alternative query when providing search results in response to a search query, e.g., a natural language query.

In the process 400, prior to accessing the profile tree and generating the alternative query (e.g., as described with respect to the process 300), a first search is performed using the search query to identify a first plurality of result documents responsive to the search query (402). In this first search, personalized term importance evaluation using the personal profile tree is not used. In some implementations, stop words removal and/or other generalized term importance evaluation can be performed during the first search.

After the first search is performed, quality of the first plurality of result documents can be determined (404). In some implementations, the quality of the first plurality of result documents can be evaluated based on the IR scores of the result documents. In some implementations, other factors can also be used to evaluate the quality of the result documents, such as user feedback, authority, and age associated with each of the result documents.

In some implementations, a predetermined quality criterion is specified, and it is determined whether the quality of the first plurality of result documents meets this predetermined quality criterion (405). If the quality of the first plurality of result documents do not satisfy a pre-determined quality criterion (e.g., a minimum information retrieval score), the search engine can proceed to access the profile tree and generating the alternative query as describe with respect to process 300 (406). If the quality of the first plurality of result document does satisfy the pre-determined quality criterion, then first search result data is provided to a client device associated with the user identifier, where the first search result data is operable for causing the client device to present a first result listing comprising the first plurality of result documents (408).

If the process 300 is invoked, a second search using the alternative query is performed to identify a second plurality of result documents responsive to the alternative query (410). The alternative query includes a subset of search terms and/or phrases that are likely to be more relevant to the interests of the user associated with the user identifier. Second search result data can be provided to the client device associated with the user identifier, where the second search result data is operable for causing the client device to present a second result listing comprising the second plurality of result documents (412).

In some implementations, the IR scores of the second plurality of result documents are compared with the IR scores of the first plurality of result documents, and the second search result data are only provided to the client device if the IR scores of the second plurality of result documents are better than the IR scores of the first plurality of result documents.

Although the process 400 is described in the context of a natural language query, the same process can be implemented with other queries, e.g., queries of only several terms.

Computer Devices

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 5:
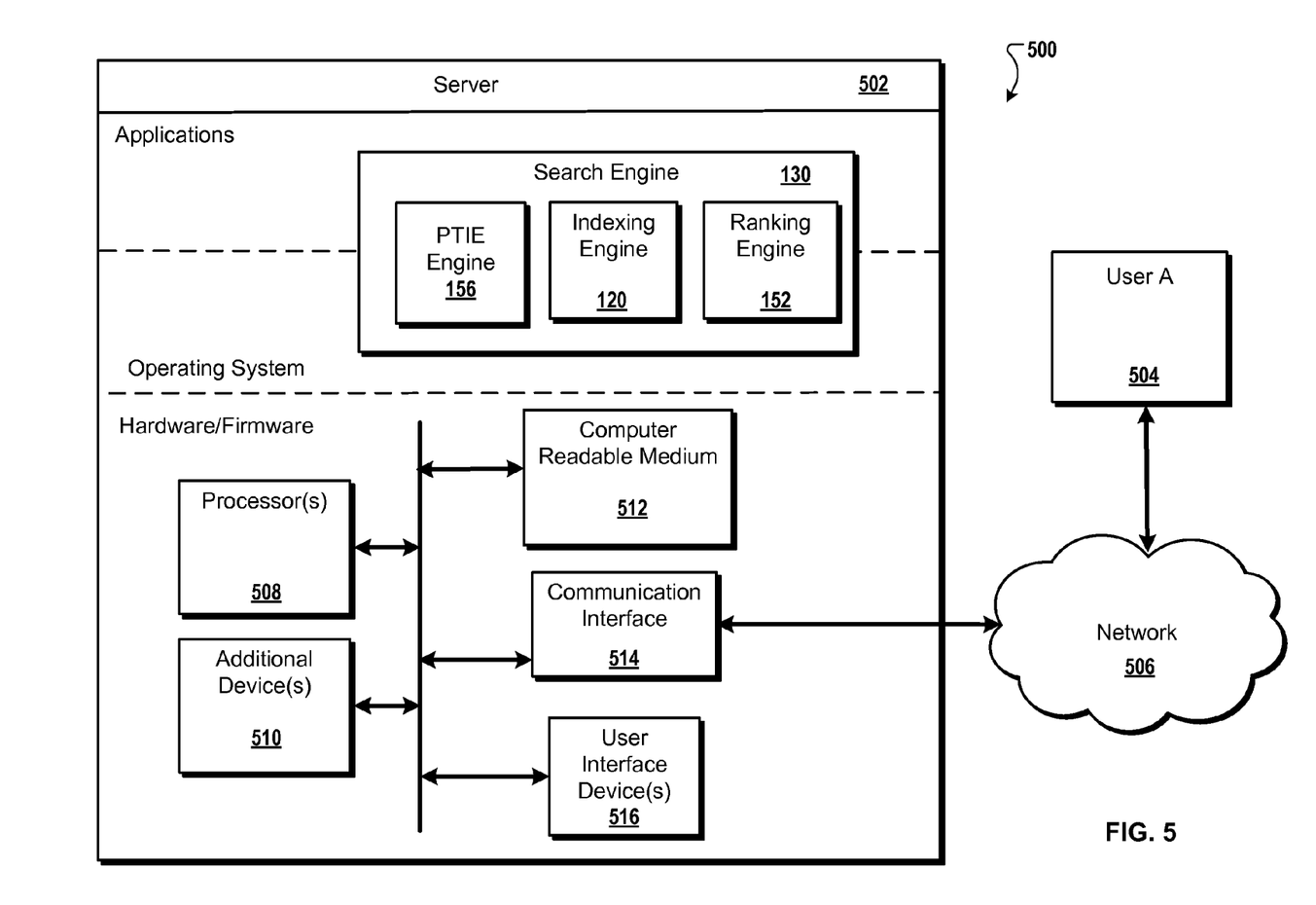
FIG. 5 is a block diagram of an example operating environment for an example computing device.

FIG. 5 shows a block diagram of a environment 500 suitable for implementing apparatus or performing methods of various aspects of the subject matter described in this specification. The environment 500 consists of a server 502 communicating with one or more user computers such as user computer A 504. The server 502 and user computers 504 are connected through a network 506.

The server 502 consists of one or more data processing apparatus. While only one data processing apparatus is shown in FIG. 5, multiple data processing apparatus can be used. The server includes various modules, e.g. executable software programs, including a query suggestion engine 156 and a search engine 130. Each module runs as part of the operating system on the server, runs as an application on the server, or runs as part of the operating system and part of an application on the server.

The search engine 130 includes an indexing engine 120 and a ranking engine 152. The search engine 130 generates search results responsive to queries, for example, as described above with reference to FIG. 1. The search engine 130 also includes a PTIE engine 152 that provides personalized term importance evaluation, for example, as described with reference to FIGS. 1-4.

The server 502 can also have hardware or firmware devices including one or more processors 508, one or more additional devices 510, a computer readable medium 512, a communication interface 514, and one or more user interface devices 516. Each processor 508 is capable of processing instructions for execution within the server 502. Each processor 508 is capable of processing instructions stored on the computer readable medium 512 or on a storage device (e.g., an additional device 510). The server 502 uses its communication interface 514 to communicate with one or more computers, for example, over a network. Examples of user interface devices 516 include a display, a camera, a speaker, a microphone, a tactile feedback device, a keyboard, and a mouse.

The server 502 can store instructions that implement operations associated with the modules described above, for example, on the computer readable medium 512 or one or more additional devices 510, for example, one or more of a floppy disk device, a hard disk device, an optical disk device, or a tape device. In some implementations, the data processing apparatus 502 also stores additional data, for example, user preference data, person profile tree data, or other data, on the computer readable medium 512 or one or more additional devices 510.

User computers such as user computer A 504 are connected to the server 502 through the network 506. Users submit search queries to the server 502 and select search results received from the server 502 using user computers such as user computer A 504, for example, using a web-browser running on the computer. The server 502 generates user preference data from the actions of the users, for example, by tracking what search queries are submitted by users and what search results responsive to a query are selected by users. Users can also use user computers such as user computer A 504 to submit search queries to the server 502 and to view search results responsive to their queries, as well as query refinements for the queries.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
receiving a search query, the search query comprising a sequence of search terms and associated with a user identifier;
accessing a profile tree associated with the user identifier and including a hierarchy of nodes, the hierarchy of nodes including a root node and a plurality of child nodes, each child node descending from the root node or another child node, the profile tree defining a plurality of levels, each level including child nodes that descend from the root node at a same depth, and each node of the profile tree representing a respective topic that is derived from search history data associated with the user identifier, and each node of the profile tree corresponding to at least one of a term or a phrase, and wherein the terms and phrases of the profile tree correspond to the nodes of the profile tree according to the respective topics to which the terms and phrases belong;
for each of the search terms:
identifying in the profile tree one or more nodes that match the search term;
determining the respective levels of the one or more nodes that match the search term;
determining a respective child count for each of the one or more nodes that match the search term, the child count for each node being proportional to a number of child nodes descending directly from the node and a number of child nodes descending indirectly from the node; and
determining a respective importance score for the search term based on the respective levels of the one or more nodes that match the search term and the respective child counts of the one or more nodes that match the search term, wherein the importance score is directly proportional to depths of the respective levels of the one or more nodes that match the search term, and is inversely proportional to the respective child counts of the one or more nodes that match the search term;
identifying search terms in the search query that have respective importance scores exceeding a threshold; and
generating an alternative query from the identified search terms that have respective importance scores that exceed the threshold.

2. The method of claim 1, further comprising:
removing one or more stop words from the search query to produce the sequence of search terms.

3. The method of claim 1, wherein the search terms and phrases are search terms and phrases previously entered by a user in association with the user identifier.

4. The method of claim 3, wherein:
for each of the sequence of search terms in the search query, the one or more nodes that match the search term explicitly correspond to the search term.

5. The method of claim 1, wherein the search terms and phrases are terms and phrases extracted from result documents that have been previously selected by a user in association with the user identifier.

6. The method of claim 1, wherein for each of the sequence of search terms in the search query, the one or more nodes that match the search term each represents a respective topical category that includes a concept represented by the search term.

7. The method of claim 1, further comprising:
generating a plurality of search phrases from the sequence of search terms, each search phrase including two or more consecutive search terms;

for each of the search phrases:
identifying in the profile tree one or more nodes corresponding to phrases that match the search phrase;
determining the respective levels of the one or more nodes corresponding to phrases that match the search phrase;
determining respective counts of child nodes for the one or more nodes corresponding to phrases that match the search phrase; and
determining a respective importance score for the search phrase based on the respective levels and the respective counts of child nodes for the one or more nodes corresponding to phrases that match the search phrase;
identifying search phrases in the search query that have respective importance scores exceeding the threshold; and
generating the alternative query from both the identified search terms and the identified search phrases that have respective importance scores exceeding the threshold.

8. The method of claim 1, further comprising:
prior to accessing the profile tree and generating the alternative query:
performing a first search using the search query to identify a first plurality of result documents responsive to the search query;
determining quality of the first plurality of result documents;
proceeding to accessing the profile tree and generating the alternative query if the quality of the first plurality of result documents does not satisfy a pre-determined quality criterion; and
providing first search result data to a client device associated with the user identifier if the quality of the first plurality of result document satisfy the pre-determined quality criterion, the first search result data operable for causing the client device to present a first result listing comprising the first plurality of result documents.

9. The method of claim 8, further comprising:
performing a second search using the alternative query to identify a second plurality of result documents responsive to the alternative query; and
providing second search result data to the client device associated with the user identifier, the second search result data operable for causing the client device to present a second result listing comprising the second plurality of result documents.

10. A non-transitory computer-readable medium having instructions stored thereon, the instructions, when executed by one or more processors, cause the processors to perform operations comprising:
receiving a search query, the search query comprising a sequence of search terms and associated with a user identifier;
accessing a profile tree associated with the user identifier and including a hierarchy of nodes, the hierarchy of nodes including a root node and a plurality of child nodes, each child node descending from the root node or another child node, the profile tree defining a plurality of levels, each level including child nodes that descend from the root node at a same depth, and each node of the profile tree representing a respective topic that is derived from search history data associated with the user identifier, and each node of the profile tree corresponding to at least one of a term or a phrase, and wherein the terms and phrases of the profile tree correspond to the nodes of the profile tree according to the respective topics to which the terms and phrases belong;
for each of the search terms:
identifying in the profile tree one or more nodes that match the search term;
determining the respective levels of the one or more nodes that match the search term;
determining a respective child count for each of the one or more nodes that match the search term, the child count for each node being proportional to a number of child nodes descending directly from the node and a number of child nodes descending indirectly from the node; and
determining a respective importance score for the search term based on the respective levels of the one or more nodes that match the search term and the respective child counts of the one or more nodes that match the search term, wherein the importance score is directly proportional to depths of the respective levels of the one or more nodes that match the search term, and is inversely proportional to the respective child counts of the one or more nodes that match the search term;
identifying search terms in the search query that have respective importance scores exceeding a threshold; and
generating an alternative query from the identified search terms that have respective importance scores that exceed the threshold.

11. The computer-readable medium of claim 10, wherein the operations further comprise:
removing one or more stop words from the search query to produce the sequence of search terms.

12. The computer-readable medium of claim 10, wherein the search terms and phrases are search terms and phrases previously entered by a user in association with the user identifier.

13. The computer-readable medium of claim 12, wherein:
for each of the sequence of search terms in the search query, the one or more nodes that match the search term explicitly correspond to the search term.

14. The computer-readable medium of claim 10, wherein the search terms and phrases are terms and phrases extracted from result documents that have been previously selected by a user in association with the user identifier.

15. The computer-readable medium of claim 10, wherein for each of the sequence of search terms in the search query, the one or more nodes that match the search term each represents a respective topical category that includes a concept represented by the search term.

16. The computer-readable medium of claim 10, wherein the operations further comprise:
generating a plurality of search phrases from the sequence of search terms, each search phrase including two or more consecutive search terms;
for each of the search phrases:
identifying in the profile tree one or more nodes corresponding to phrases that match the search phrase;
determining the respective levels of the one or more nodes corresponding to phrases that match the search phrase;
determining respective counts of child nodes for the one or more nodes corresponding to phrases that match the search phrase; and
determining a respective importance score for the search phrase based on the respective levels and the respective counts of child nodes for the one or more nodes that match the search phrase;

identifying search phrases in the search query that have respective importance scores exceeding the threshold; and generating the alternative query from both the identified search term and the identified search phrases that have respective importance scores exceeding the threshold.

17. The computer-readable medium of claim 10, wherein the operations further comprise:

prior to accessing the profile tree and generating the alternative query:

performing a first search using the search query to identify a first plurality of result documents responsive to the search query;

determining quality of the first plurality of result documents;

proceeding to accessing the profile tree and generating the alternative query if the quality of the first plurality of result documents does not satisfy a pre-determined quality criterion; and providing first search result data to a client device associated with the user identifier if the quality of the first plurality of result document satisfy the pre-determined quality criterion, the first search result data operable for causing the client device to present a first result listing comprising the first plurality of result documents.

18. The computer-readable medium of claim 17, wherein the operations further comprise:

performing a second search using the alternative query to identify a second plurality of result documents responsive to the alternative query; and providing second search result data to the client device associated with the user identifier, the second search result data operable for causing the client device to present a second result listing comprising the second plurality of result documents.

19. A system, comprising:

one or more processors; and memory having instructions stored thereon, the instructions, when executed by the one or more processors cause the processors to perform operations comprising:

receiving a search query, the search query comprising a sequence of search terms and associated with a user identifier;

accessing a profile tree associated with the user identifier and including a hierarchy of nodes, the hierarchy of nodes including a root node and a plurality of child nodes, each child node descending from the root node or another child node, the profile tree defining a plurality of levels, each level including child nodes that descend from the root node at a same depth, and each node of the profile tree representing a respective topic that is derived from search history data associated with the user identifier, and each node of the profile tree corresponding to at least one of a term or a phrase, and wherein the terms and phrases of the profile tree correspond to the nodes of the profile tree according to the respective topics to which the terms and phrases belong;

for each of the search terms:

identifying in the profile tree one or more nodes that match the search term;

determining the respective levels of the one or more nodes that match the search term;

determining a respective child count for each of the one or more nodes that match the search term, the child count for each node being proportional to a number of child nodes descending directly from the node and a number of child nodes descending indirectly from the node; and determining a respective importance score for the search term based on the respective levels of the one or more nodes that match the search term and the respective child counts of the one or more nodes that match the search term, wherein the importance score is directly proportional to depths of the respective levels of the one or more nodes that match the search term, and is inversely proportional to the respective child counts of the one or more nodes that match the search term;

identifying search terms in the search query that have respective importance scores exceeding a threshold; and generating an alternative query from the identified search terms that have respective importance scores that exceed the threshold.

20. The system of claim 19, wherein the operations further comprise:

removing one or more stop words from the search query to produce the sequence of search terms.

21. The system of claim 19, wherein the search terms and phrases are search terms and phrases previously entered by a user in association with the user identifier.

22. The system of claim 21, wherein:

for each of the sequence of search terms in the search query, the one or more nodes that match the search term explicitly correspond to the search term.

23. The system of claim 19, wherein the search terms and phrases are terms and phrases extracted from result documents that have been previously selected by a user in association with the user identifier, and the terms and phrases included in the profile tree are distributed among the nodes in the profile tree according to the respective topics to which the terms and phrases belong.

24. The system of claim 19, wherein for each of the sequence of search terms in the search query, the one or more nodes that match the search term each represents a respective topical category that includes a concept represented by the search term.

25. The system of claim 19, wherein the operations further comprising:

generating a plurality of search phrases from the sequence of search terms, each search phrase including two or more consecutive search terms;

for each of the search phrases:

identifying in the profile tree one or more nodes corresponding to the phrases that match the search phrase;

determining the respective levels of the one or more nodes corresponding to the phrases that match the search phrase;

determining respective counts of child nodes for the one or more nodes corresponding to the phrases that match the search phrase; and determining a respective importance score for the search phrase based on the respective levels and the respective counts of child nodes for the one or more nodes that match the search phrase;

identifying search phrases in the search query that have respective importance scores exceeding the threshold; and generating the alternative query from both the identified search terms and the identified search phrases that have respective importance scores exceeding the threshold.

26. The system of claim 19, wherein the operations further comprise:
  prior to accessing the profile tree and generating the alternative query:
    performing a first search using the search query to identify a first plurality of result documents responsive to the search query;
    determining quality of the first plurality of result documents;
    proceeding to accessing the profile tree and generating the alternative query if the quality of the first plurality of result documents does not satisfy a pre-determined quality criterion; and
    providing first search result data to a client device associated with the user identifier if the quality of the first plurality of result document satisfy the pre-determined quality criterion, the first search result data operable for causing the client device to present a first result listing comprising the first plurality of result documents.

27. The system of claim 26, wherein the operations further comprise:
  performing a second search using the alternative query to identify a second plurality of result documents responsive to the alternative query; and
  providing second search result data to the client device associated with the user identifier, the second search result data operable for causing the client device to present a second result listing comprising the second plurality of result documents.

* * * * *